United States Patent [19]

Dumbaugh

[11] 4,307,989
[45] Dec. 29, 1981

[54] VIBRATING DENSIFIER FOR CAR LADING

[75] Inventor: George D. Dumbaugh, Louisville, Ky.

[73] Assignee: Kinergy Corporation, Louisville, Ky.

[21] Appl. No.: 84,824

[22] Filed: Oct. 15, 1979

[51] Int. Cl.³ .............................................. B65G 67/24
[52] U.S. Cl. ................................................... 414/375
[58] Field of Search ........................ 414/363, 375, 415; 366/108, 110, 128

[56] References Cited

U.S. PATENT DOCUMENTS

| | | | |
|---|---|---|---|
| 2,818,184 | 12/1957 | Matson | 414/375 |
| 3,047,169 | 7/1962 | Matson | 414/375 |
| 3,920,135 | 11/1975 | Wetzel | 414/363 |
| 4,180,458 | 12/1979 | Shahan | 366/128 |
| 4,224,006 | 9/1980 | Dumbaugh et al. | 414/375 |

Primary Examiner—Joseph E. Valenza
Attorney, Agent, or Firm—McWilliams, Mann & Zummer

[57] ABSTRACT

This invention relates to a car side wall vibrating mechanism adapted to densify a bulk lading going into the car, or to facilitate unloading of lading from the car and wherein the natural frequency of structural beams facing the car is higher than the speed of the motors driving the mechanism, which are mounted in fixed relation to the beams and located between spaced elements adapted to engage the beams with the car side wall, with such spaced elements having separate supporting structures with the entire structure supported on a base having means anchoring the car rails with anchor means embedded in the base. The arrangement utilizes multiple stabilizers for the elements referred to, with at least one such stabilizer under the motor mount.

6 Claims, 3 Drawing Figures

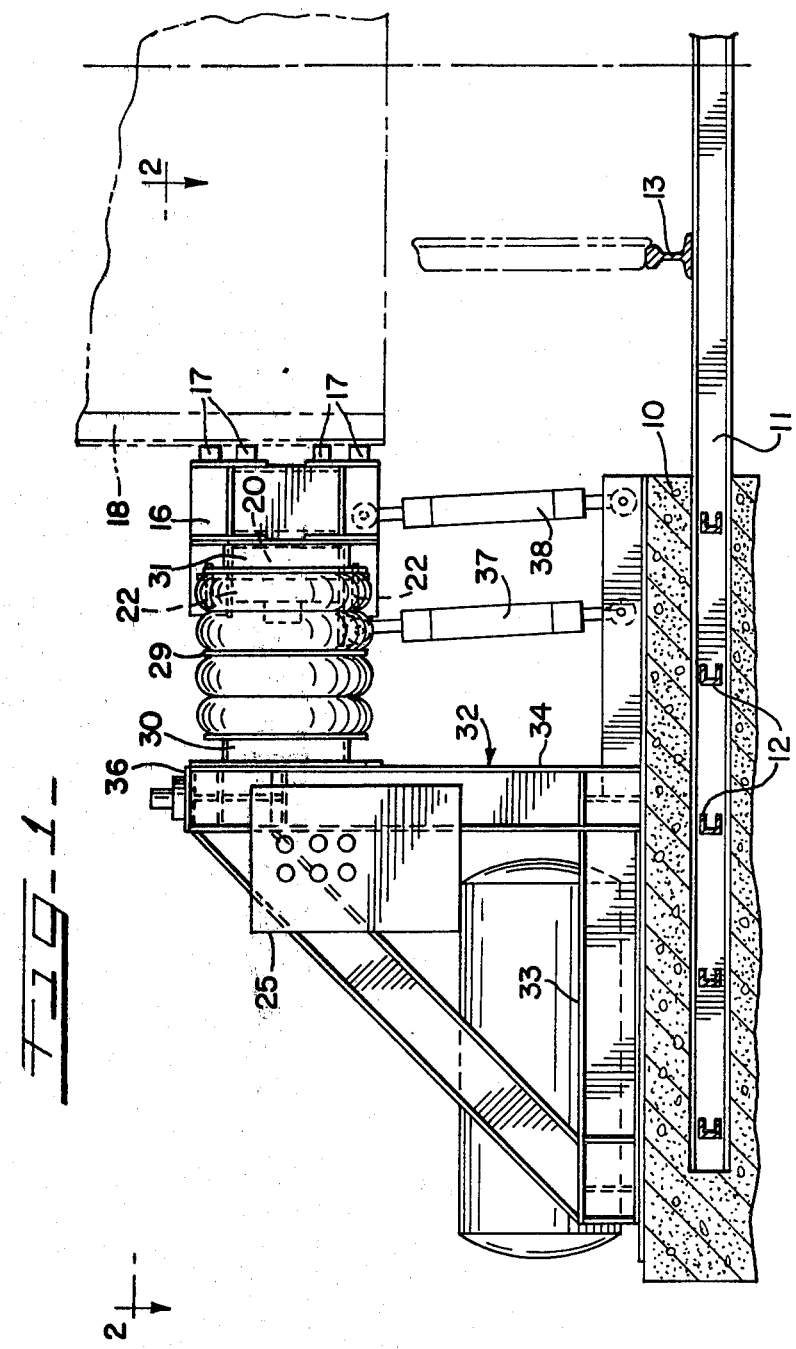

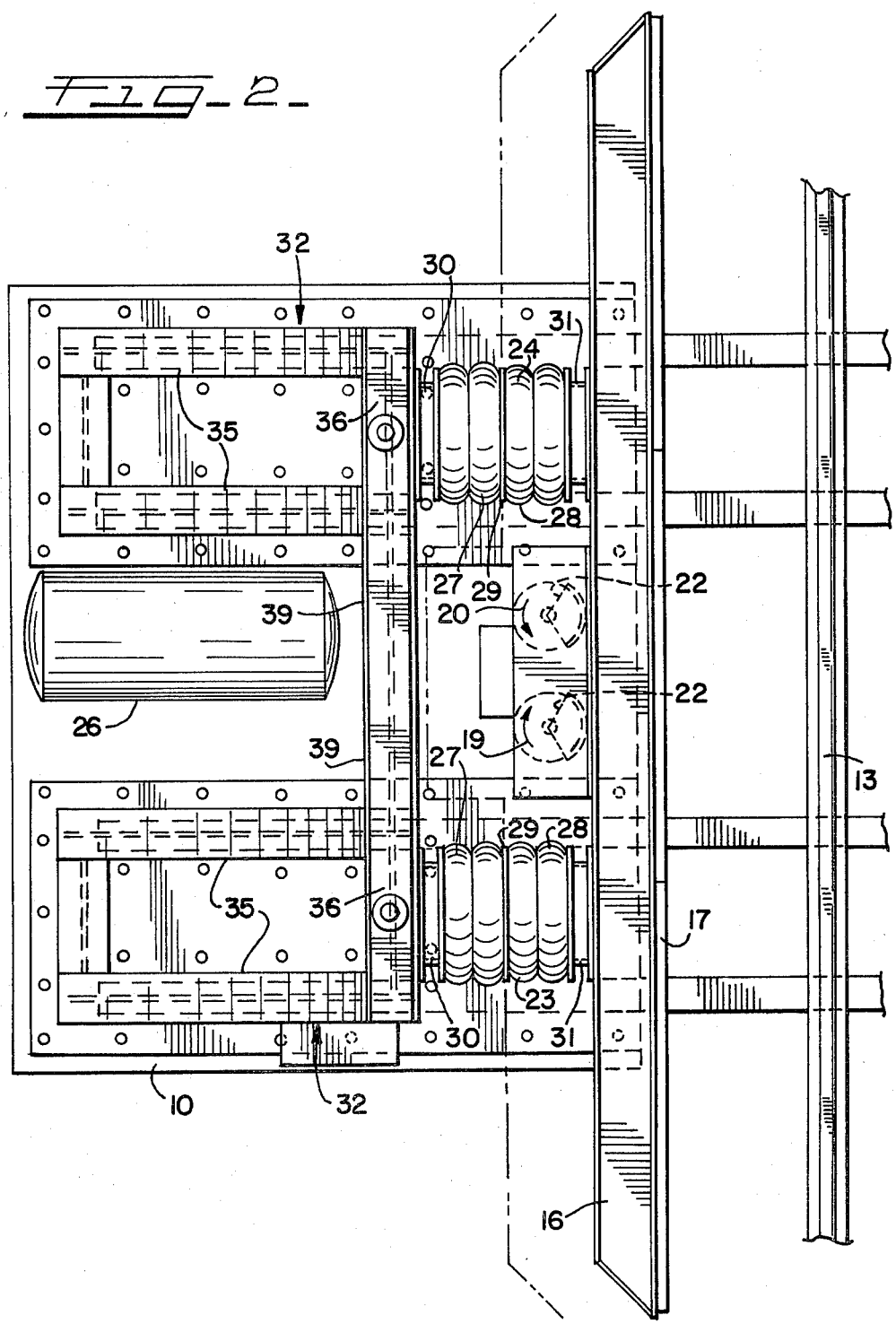
FIG_2

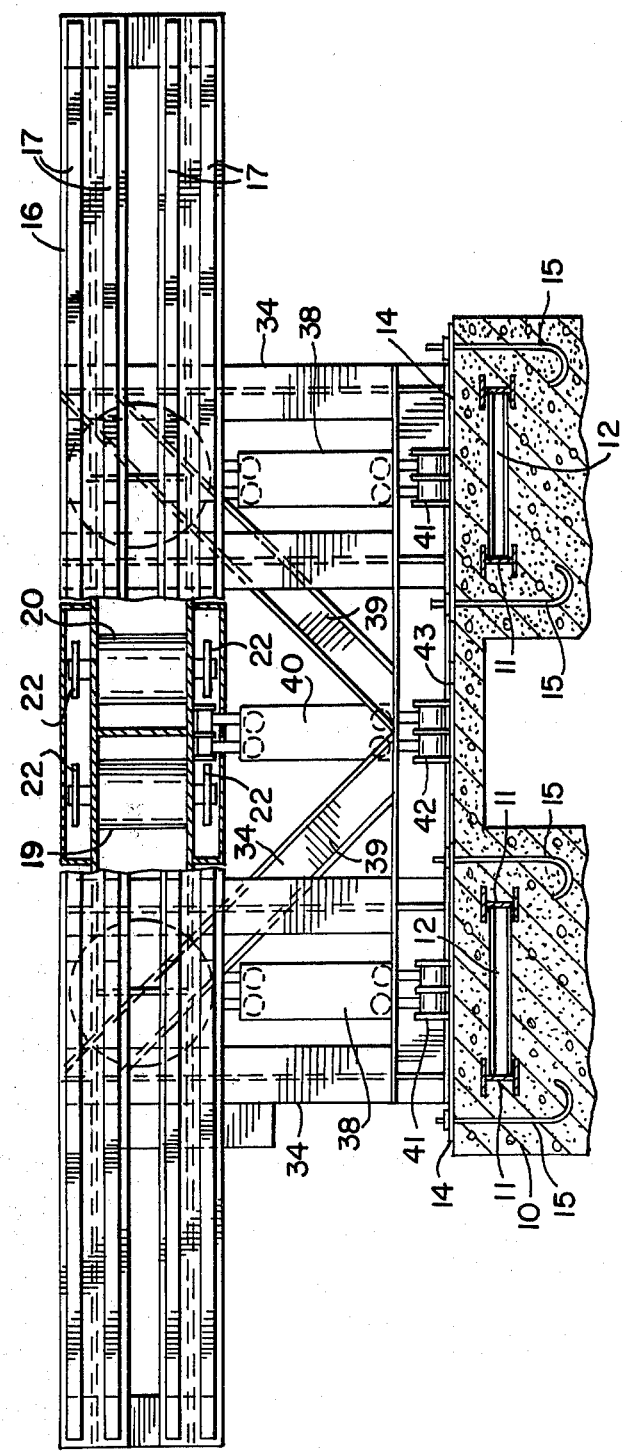

VIBRATING DENSIFIER FOR CAR LADING

BACKGROUND OF THE INVENTION

1. Field of the Invention:

This invention is in the field of those devices heretofore provided for vibrating railway cars to effect the unloading of ladings which may be compacted during transit, in the case of bulk ladings, or frozen as with coal, or wet ladings.

2. Description of the Prior Art:

Prior devices in this field have involved metal-to-metal contact between a vibrator mechanism and a railway car which have been utilized as a shake-out to discharge lading through bottom outlets. Such arrangements not only were extremely noisy and detrimental to the environment in this respect, necessitating workmen to wear ear protection in the vicinity of the operation, but in the case of such devices mounted on top of a hopper car for instance, which necessitated use of a crane, the pounding action on the car was so severe as to cause excessive damage to the car.

In the case of a riveted car structure observers have seen the rivets loosen and shake visibly and where bolts were involved the nuts were seen to practically spin off the bolt during the vibration. Some devices immediately preceding the development of this invention utilized non-metallic means between the vibrating structure and the car side wall but in actual practice the non-metallic means, while it reduced the noise level substantially, was unable to stand the various forces involved and due to the friction and heat developed during operation was incapable of functioning for more than a very brief period.

The non-metallic parts were found to last hardly more than a minute when they would begin to smoke and burn and ultimately were completely consumed. These elements were made of rubber strips and where they were pressed against the side of a car they became very hot at the point of contact and the more the rubber burned the higher the noise level became and of course, the unit became less effective in discharging the lading.

Various alternates to the rubber strips were tried in an effort to correct the problem-different grades of rubber were tried, nylon corded strips were tested and even wooden beams 4"×4" were tried, but all without success and without solving the problem of the short life cycle of the non-metallic elements. At no time was it recognized that the natural frequencies of the vibrating structure relative to the driving motor speed may have been a contributing factor to the problem.

SUMMARY OF THE INVENTION

The present invention utilizes a structure that better distributes the vibrating forces on the car structure in a way that avoids concentrated areas of pressure and vibration in otherwise relatively small non-metallic units and utilizes face beams that are designed to have a natural structural frequency of at least the square root of two above the speed of the driving motors.

The driving motors are fixed directly to the face beams and are located between the actuators that move the face beams toward the car side and retract the beams, when inoperative, so that the linear actuators are disposed in parallel and outboard in relation to the motors with the motors located on the centerline of the face beams midway between the actuators.

For stability, the arrangement utilizes two rows of stabilizer struts to prevent excessive wear on the linear actuators during advancing and retracting movements and one of the stabilizers is located directly under the motor mounting structure. This plurality of stabilizers struts not only affords added stability but assures a higher support natural frequency that provides greater stability on the face beam member when it is pressed against the car side by the linear actuators.

The entire vibratory apparatus is mounted on a foundation structure that includes a base block upon which everything is supported. In order to anchor the railway rails relative to this block in a manner to oppose the lateral forces imposed against the side wall of a car, structural beams are implanted in the block and extend under and are connected to both of the rails. The structural beams in the base block are connected by a cross beam, which may be of channel section, to more securely anchor the beams in the block for positive retention of the car rails in proper position.

Each of the linear structure is provided with separate structural support and even though the two structures are diagonally braced, the independent mounting of the actuators enables the structural natural frequency of the support structure to be maintained above the forced frequency of the driving means, or motor speed, to the same extent as with respect to the face beams, namely to the same ratio of at least 1.412 magnitude in the difference between the two.

OBJECTS OF THE INVENTION

The primary purpose of this invention is to provide a railway car vibrator having non-metallic engagement with the car and wherein the face beams behind the non-metallic element have a structural natural frequency substantially higher than the speed of the driving motors.

The principal object of the invention is realized in the provision of a railway car vibrator where a face beam structure has a natural structural frequency that is at least equal to the square root of two above the speed of the driving motors.

An important object of the invention is to provide a railway car vibrator having a face beam structure adapted to be pressed against a car side wall by linear actuators that are spaced apart and mounted in parallel with one or more driving motors disposed between the actuators and mounted on the centerline of the face beam structure.

Another object of the invention is the provision of a railway car vibrator arrangement including a face beam, linear actuators and a driving motor, wherein stabilizing struts are provided in pairs under the actuators and at least one stabilizer strut is provided under the driving motor.

A further object of the invention is to provide a railway car vibrator arrangement including a face beam and a pair of spaced apart linear actuators wherein each such actuator has a separate support structure.

A still further object of the invention is the provision of a railway car vibrator arrangement wherein the apparatus is supported on a base foundation with structural beams extending from the foundation beneath adjacent railway rails and connected thereto with a cross-beam embedded in the foundation connecting the structural beams.

DESCRIPTION OF THE DRAWINGS

The foregoing and other and more specific objects of the invention are attained by the vibrator construction and arrangement illustrated in the accompanying drawings wherein FIG. 1 is an end elevational view of a car vibrator structure in accordance with this invention showing the structure mounted on a base foundation connected to the car supporting rails and with a face beam pressed against a car side by linear actuators each stabilized by a pair of stabilizer struts;

FIG. 2 is a plan view of the vibrator structure showing the full length face beam engaged by widely spaced linear actuators for advancing and retracting the beam with the actuators backed up by separate supporting structures and revealing the driving motors midway between the actuators and in fixed direct association with the face beam; and FIG. 3 is a front elevational view of the vibrator structural showing the face beam with front mounted non-metallic strips for engagement with a car side wall with the spaced apart supporting structures separately formed for the linear actuators and the arrangement of stabilizer struts beneath the actuators and centrally below the drive motor mounting and with all of the parts supported from a slab comprising a base foundation.

DESCRIPTION OF PREFERRED EMBODIMENT

In the drawings, the reference 10 represents a base foundation for a trackside railway car vibrator mechanism of this invention, which is in the form of a heavy block, or slab, that may be constructed of poured concrete having a pair of embedded structural members 11 projecting outwardly therefrom and extending under a pair of rails 13 to which they are securely fastened to hold the rails in fixed relation to the foundation slab against the lateral reaction of the vibrator mechanism engaged with a car side wall of a hopper car 18, or the like, on the rails. The structural members 11 are connected together by one or more cross-members 12, which my be in the form of channel sections, also embedded in the slab and which securely anchors the structural members against displacement relative to the slab. A pair of bed plates 14 are mounted on the top surface of the slab 10 and secured by anchor bolts 15 embedded in the slab.

The vibrator mechanism includes a face beam structure 16 having non-metallic strips 17, secured on the face of the beam and which may be comprised of rubber having a suitable durometer reading, or made from a synthetic material having the desired properties necessary to operation in a service of the kind to which the vibrator is subjected in shaking a railway car to densify the lading during loading, or to break up a compacted lading, or one that may be wet, or frozen, during unloading operations at a terminal. The face beam 16 may be constructed from rolled sections having the required properties but, as shown, is fabricated from flat plates welded into an assembly having the natural structural frequency necessary to the successful operation of a car vibrator of the type disclosed herein.

By fabricating the face beam as a welded assembled structure the desired frequency can more or less be built into the beam and in accordance with this invention the frequency incorporated in the face beam is designed to exceed the frequency represented by the speed of the motors driving the vibrator. Preferably, the natural structural frequency of the face beam 16 is designed to be above the forced frequency of the vibratory means as represented by speed of the driving motors, by at least the square root of two (1.412). As disclosed herein, the driving motors for vibrating the beam 16 have a speed of up to 1800 RPM while the natural structural frequency of the face beam assembly is at least 2700 CPM. The structural natural frequency of the face beam may be at least the square root of two above the operating speed of the driving motors in accordance with the teachings of this invention, as disclosed herein. By this means, any relative motion between the face beam and the car side 18 will be eliminated and localized heat generation due to friction between the rubber bumper strips 17 and the car side will be eliminated so that the life span of the bumper strips is extended far beyond the period experienced in previous vibrators of this general type.

The face beam 16 is vibrated by driving motors 19 and 20 mounted directly thereon by means of bracket structure 21 secured to the back side of the beam. It will be noted from FIG. 2 that the beam 16 is of considerable length for extended engagement with the railway car side wall 18 and the driving motors assembly is mounted midway of the length of the beam on the centerline of the face beam. The driving motors 19 and 20 are each provided with a pair of eccentrics 22 mounted on the drive shafts of the respective motors. The motors are disposed between top and bottom brackets 21 and have their axes disposed vertically and the motor shafts extend through the opposite ends of the motors and the eccentrics 22 are mounted on both ends of each shaft whereby maximum vibratory action is obtained.

The face beam 16 is movable toward and away from the car side wall 18 by means of a pair of spaced apart linear actuators 23 and 24, which also act as isolators between the face beam and backup structure and which advance and retract the vibratory beam 16 under the control of an operators panel 25. The linear actuators are operated by air and an air compressor assembly 26 provides the power for effecting the linear movements of the actuators in advancing and retracting the face beam with its attached motor assembly toward and away from a car side wall. The driving motors 19 and 20, mounted in the bracket structure 21, are located between the linear actuators 23 and 24 with the actuators disposed in parallel relation to the vibratory action of the motors and respectively outboard of the motors.

The linear actuators 23 and 24 are each comprised of flexible air chambers 27 and 28 with a central supporting plate 29 and outer flanged collar members 30 and 31. The collar members 31 are each engaged behind and secured to the back side of the face beam 16 in position to exert pressure against the beam and maintain the beam in contact with the car side 18 through the medium of the rubber bumper strips 17. The rear collar members 30 are engaged with and secured to a rigid frame structure 32 mounted on and secured to the bed plates 14 and it will be noted that a separate rigid frame structure 32 is provided for each linear actuator, as best indicated in FIG. 2.

The rigid frame structure 32 acts as a backup for each of the linear actuators and against which the forces of the air operated actuators react in pressing the face beam 16 and rubber bumpers 17 against the car side 18 and holding this engagement during the entire operation of vibrating the car to densify a lading being loaded into the car, or to loosen up a lading and cause it to flow through bottom discharge outlets during unloading operations. Each rigid frame assembly includes a pair of spaced apart rearwardly extending base members 33 secured to the respective bed plates 14, upright members 34 secured to the base members adjacent what may be described as the front end of the rigid structures 32 and a pair of diagonal members 35 extending rearwardly and downwardly from adjacent the top ends of the verticals 34 to the rear ends of the respective base members 33 thus effectively to brace the structures 32 against the forces exerted by the linear actuators 23 and 24 during the vibrational periods when the units are in operation. The uprights 34 of each structure 32 are connected across the top by horizontal members 36 affording structure acting directly as the backup for the respective linear actuators 23 and 24. The rigid structures 32 are separate and independent whereby each linear actuator has its own structural support so that the natural structural frequency of the structural support for each actuator can be maintained above the forced frequency of the vibrating mass as determined by the speed of the driving motors and to the same extent of at least 1.412 difference in magnitude. A diagonal bracing memer 39 extends downwardly at an angle from the top of each structure 32 and connects with the base structure of the assembly to lend greater stability to the separate structures 32 in a direction laterally of the independent back-ups for the linear actuators 23 and 24.

As best shown in FIG. 1, it will be seen that two rows of stabilizing arms, or struts 37 and 38, are provided beneath the linear actuators 23 and 24 and extending between the actuators and the bed plates 14. The stabilizer struts 37 are connected at their upper ends to the intermediate plate 29 of the actuators but the stabilizer struts 38 are connected beneath the under side of the face beam structure 16 in line with each of the linear actuators so that greater stability for the actuators and contribute to a higher natural frequency in the support structure and in turn affords greater stability of the face beam when it is advanced and pressed against the car side 18. By the added stability thus provided for the linear actuators excessive wear on the actuators also is prevented as they advance and retract between the operative vibratory position and the inoperative position at rest.

At least one stabilizer strut 40 (see FIG. 3) is disposed midway between the struts 37/38 under the respective linear actuators and this strut is mounted directly under the driving motor supporting bracket assembly 21 and this adds further to the stability of the face plate member 16. The stabilizer struts 37/38 and 40 respectively are mounted at the bottom by means of brackets 41 on the bed plates 14 and by means of bracket 42 on a central bed plate 43.

From the foregoing it will be seen that an improved railway car shaker device has been provided in the form of a trackside vibrator mechanism that eliminates relative motion at the face beam of the unit between the surface of the car engaged by the face beam and the unit to avoid generation of localized heat that otherwise would be developed by friction due to any relative movement between the parts during vibrational operation. The improvements are best realized by separating the linear actuators in widely spaced relationship and providing a natural structural frequency of the face beam structure of at least 1.412 magnitude above the forced frequency provided by the driving motor RPM. A similar natural structural frequency in the supporting structure of the unit above the driving motor speed by at least 1.412 also contributes to the improvements realized by this invention and mounting of the driving motors directly on the face beam structure adds further to the efficiency of this trackside unit. These natural frequencies of these structures are substantially greater than the motor speed and the frequencies may exceed the motor running speed by at least the square root of two within the range of improvements contemplated and afforded by this concept. All of these features are enhanced by the stability afforded by the multiple stabilizer struts under the linear actuators and by the stabilizer strut arrangement under the driving motor mounting.

What is claimed is:

1. In a railway car vibrator mechanism including a base supporting structure and a face beam, a plurality of stabilizer struts pivotally supporting said face beam on said structure, said struts forming a parallel linkage support for said face beam, a pair of linear actuators mounted between said supporting structure and said face beam, said linear actuators each mounted on separate support structures which are mounted on said base structure and spaced substantially wide apart, means to actuate said actuators to move said face beam relative to said car and to press said face beam against the car during operation, vibrating motor means mounted directly on said face beam and laterally spaced from said actuators, said beam having a natural structural frequency substantially higher than said vibrating motor means in the ratio of at least the square root of two above the speed of said motor means, and non-metallic means on the face of said beam.

2. The railway car vibrator mechanism as set forth in claim 1 wherein the speed of the motor means is on the order of up to 1800 RPM and said structural frequency is on the order of at least 2700 CPM.

3. The railway car vibrator mechanism as set forth in claim 1 wherein said motor means is mounted on the centerline of said face beam and said actuators are disposed in parallel.

4. The railway car vibrator mechanism as set forth in claim 3 wherein said stabilizers include a pair of stabilizer struts mounted to said face beam below and in line with each actuator, and at least one stabilizer strut under said motor means.

5. The railway car vibrator mechanism as set forth in claim 4 wherein said base structure comprises a base foundation slab which provides total support for the mechanism and one or more structural beams which extend beyond the slab beneath and connected to a pair of rail car wheels, and a cross-beam embedded in said slab and connecting the structural beams.

6. The railway vibrator mechanism as set forth in claim 1 wherein each of said separate support structures has a natural structural frequency of at least 1.412 above the forced frequency of the vibrator mechanism.

* * * * *